Patented May 27, 1952

2,598,586

UNITED STATES PATENT OFFICE 2,598,586

METHOD FOR PRESERVING SHELL EGGS

Leon D. Mink, Chicago, Ill., assignor to Swift & Company, Chicago, Ill., a corporation of Illinois No Drawing. Application March 14, 1950, Serial No. 149,650

5 Claims. (Cl. 99—170)

This invention relates to improvements in preserving the quality of shell eggs and particularly to a method and coating composition for reducing shrinkage losses of shell eggs.

One of the objects of the present invention is to provide a method for preserving the quality of shell eggs against dehydration and deterioration during storage and shipment.

Another object of the present invention is to provide an improved method for reducing shrinkage losses of shell eggs by the application of a coating thereto so as to prevent the loss of moisture and carbon dioxide from the shell eggs.

Another object of the present invention is to provide an improved egg coating composition.

Other objects of the present invention will be apparent from the description and claims which follow:

An important problem in the egg storage art is to prevent quality deterioration of shell eggs which takes place by the evaporation of moisture through the shell and the loss of carbon dioxide. A number of coatings have been suggested in the prior art to accomplish this purpose but none of them have been found to be entirely satisfactory.

I have discovered that the evaporation of moisture through the shell and the loss of carbon dioxide can be greatly minimized and that the shell eggs are preserved against deterioration in quality for a much longer period of time if the shell eggs are treated with a coating composition comprising a mineral oil and a cyclized rubber resin or rubber condensation derivative. These compounds are soluble in the mineral oil and when the composition is applied to the surface of the shell eggs it has been found to retard the loss of moisture by evaporation therefrom to a considerable extent.

Cyclized or condensed rubbers are well known in the art and may be prepared by treating rubber with various condensing or cylizing agents. For example, the halide of an amphoteric metal, or chlorostannic acid or phenol sulfonic acid or a combination of two or more reagents may be caused to react with rubber under controlled conditions. Boron fluoride may be used as the condensing agent. The derivative may be formed in the manner disclosed by Sebrell in United States Patent No. 2,052,423, and Endres in United States Patent No. 2,052,391. This consists essentially in reacting a solution of rubber in benzol with a condensing (or cyclizing) agent, for example, chlorostannic acid or tin tetrachloride and then decomposing the metallic addition product thus formed, and removing the metallic impurities. A product of this type is marketed as "Pliolite" resin by The Goodyear Tire and Rubber Company. The products may be essentially hydrocarbons or they may contain a small amount of one or more other elements such as halogen, etc.

In carrying out the present invention the above described cyclized rubber resin is preferably dissolved in a relatively non-volatile refined mineral white oil. I have found that a refined mineral white oil such as one having a Saybolt viscosity of about 50 to 60 seconds at 100° F. to be particularly useful. Other more viscous grades of white mineral oil may be used if desired. The solution of the cylized rubber resin in the mineral oil may be accelerated by agitation or by the application of heat if necessary.

I have found that about 1% to 10% of the cyclized rubber resin in an unmilled powdered form when added to a mineral oil composition of the type described above forms an extremely effective coating for the shell eggs so as to minimize the loss of moisture therefrom during storage and shipment. The amount of the resin is variable and the only requisite is that a sufficient amount be used to provide the required sealing action. Ordinarily not more than about 2% is necessary. I have found that this process of treatment is equally effective on both fresh shell eggs and on shell eggs which have been stabilized, that is, subjected to a heat treatment while in the shell such as described in the Funk Patent 2,423,233.

The following specific examples are illustrative of practical embodiments of the present invention:

Example I

1% by weight of unmilled powdered cyclized rubber resin was dissolved in 99 parts by weight of a refined mineral white oil having a Saybolt viscosity of about 50 to 60 seconds at 100° F. and the solution was applied to shell eggs by dipping therein. After storage of the eggs for 246 days it was found that the average weight loss of the shell eggs so treated amounted to 0.78%, whereas a similar lot of eggs in the untreated state and serving as a control showed an average weight loss of 1.07%.

Example II

The eggs were divided into two batches. One batch was treated as in Example I and the other batch by dipping in oil only. After 8½ months in storage the eggs were tested for weight loss and graded. The results were as follows:

Table I

| Treatment | Weight Loss, Per Cent | Candling Inspection | | | |
|---|---|---|---|---|---|
| | | A Grade | B Grade | C Grade | Worthless |
| Mineral Oil | 0.97 | 55.8 | 24.1 | 11.6 | 8.5 |
| Solution of 1% of cyclized rubber in mineral oil | 0.64 | 69.0 | 22.5 | 7.8 | 0.7 |

In the table which follows appear the results of the preservative action of the mineral oil composition containing varying amounts of the unmilled powdered cyclized rubber resin. The shell eggs were weighed at the beginning of the test and were stored at room temperatures (75 to 80° F.). The lots were inspected and weighed at intervals during the period of the test to determine the loss in weight due to dehydration as it is recognized that this is one of the best ways of determining the rate of deterioration in quality of shell eggs during storage.

Table II

| | Weight loss in percentage after 19 days | Weight loss in percentage after 53 days | Weight loss in percentage after 100 days |
|---|---|---|---|
| Control (untreated) | 7.15 | 20.00 | 33.80 |
| Treated in accordance with the product of Example I | 0.55 | 1.09 | 2.60 |

The eggs used in Table III below were similar to those used in Table I but the test was started at a later date.

Table III

| | Weight loss in percentage after 33 days | Weight loss in percentage after 79 days |
|---|---|---|
| Treated with a mineral oil composition as described in Example 1 to which was added 2.0% of the unmilled cyclized rubber resin | 0.74 | 2.23 |
| Treated with a mineral oil composition as described in Example 1 to which was added 10.0% of the unmilled cyclized rubber resin | 1.15 | 2.73 |

In addition to reducing the shrinkage loss of the shell eggs the mineral oil solution of the cyclized rubber resin has the effect of reducing the high oil gloss commonly found on eggs preserved by the conventional egg oiling operations.

The coating composition of the present invention can be applied to the shell eggs either by dipping, spraying, brushing or the like, it being essential only that the pores of the shells be substantially completely sealed so as to reduce shrinkage loss.

If desired, a suitable emulsifying agent such as a sulfonated oil may be mixed with the mineral oil solution of the cyclized rubber resin and the solution dispersed in water to form a cream which can then be used satisfactorily to coat shell eggs.

Obviously, many modifications and variations of the invention as hereinbefore set forth may be made without departing from the spirit and scope thereof, and therefore only such limitations should be imposed as are indicated in the appended claims.

I claim:

1. The method of protecting shell eggs from dehydration and deterioration during storage and shipment which comprises applying to the surface of said shell eggs a coating comprising a relatively non-volatile mineral oil and a cyclized rubber resin.

2. The method of protecting shell eggs from dehydration and deterioration during storage and shipment which comprises applying to the surface of said shell eggs a coating comprising a major proportion of a relatively non-volatile mineral white oil and a minor proportion of a cyclized rubber resin.

3. The method of protecting shell eggs from dehydration and deterioration during storage and shipment which comprises coating said shell eggs with a composition containing from about 90% to 99% of a relatively non-volatile mineral white oil and from about 10% to 1% of a cyclized rubber resin.

4. The method of protecting shell eggs from dehydration and deterioration during storage and shipment which comprises applying to the surface of said shell eggs a coating comprising a major proportion of a relatively non-volatile mineral white oil having a Saybolt viscosity of about 50 to 60 seconds at 100° F. and a minor proportion of a cyclized rubber resin.

5. The method of protecting shell eggs from dehydration and deterioration during storage and shipment which comprises applying to the surface of said shell eggs a coating comprising about 90% to 99% of a relatively non-volatile mineral white oil having a Saybolt viscosity of about 50 to 60 seconds at 100° F. and from about 10% to 1% of a cyclized rubber resin.

LEON D. MINK.

REFERENCES CITED

The following references are of record in the file of this patent:

UNITED STATES PATENTS

| Number | Name | Date |
|---|---|---|
| 1,245,294 | Williams | Nov. 6, 1917 |
| 2,003,192 | Hinrich et al. | May 2, 1935 |
| 2,052,391 | Endres | Aug. 25, 1936 |
| 2,216,362 | Wilson et al. | Oct. 1, 1940 |
| 2,299,951 | Ingle | Oct. 27, 1942 |
| 2,337,666 | Koonz et al. | Dec. 28, 1943 |